350-316. XR 3558805 SR

[11] 3,558,805

[72] Inventor Toshiro Watanabe
Zushi-shi, Japan

[21] Appl. No. 646,045
[22] Filed June 14, 1967
[45] Patented Jan. 26, 1971
[73] Assignee Sony Corporation
Tokyo, Japan
a corporation of Japan
[32] Priority June 15, 1966
[33] Japan
[31] 41/38671

[54] COLOR SIGNAL GENERATING APPARATUS
15 Claims, 23 Drawing Figs.

[52] U.S. Cl. .......... 178/5.4, 350/316; 178/72
[51] Int. Cl. .......... H04n 5/26
[50] Field of Search .......... 178/5.2, 5.4, 5.4STC, 5.44TCC; 350/316, 317

[56] References Cited

UNITED STATES PATENTS

| | | | |
|---|---|---|---|
| 2,733,291 | 1/1956 | Kell | 178/5.4(STC) |
| 2,736,235 | 2/1956 | Toulon | 178/5.4 |
| 2,846,498 | 8/1958 | Toulon | 350/316 |
| 2,892,883 | 6/1959 | Jesty et al. | 178/5.4STC |
| 2,917,574 | 12/1959 | Toulon | 178/5.4STC |

*Primary Examiner*—Robert L. Griffin
*Assistant Examiner*—Richard P. Lange
*Attorney*—Albert C. Johnston, Robert E. Isner, Lewis H. Eslinger and Alvin Sinderbrand

ABSTRACT: In a color video signal generating apparatus employing a single monochrome image pickup tube, an assembly of separating lenses disposed in front of the face plate of the tube to divide a real image of an object to be televised into stripelike image elements which are projected on the photoconductive layer of the tube and extend substantially at right angles to the scanning direction, and a color filter arrangement disposed in front of the separating lens assembly and having several filtering regions respectively passing light of different wavelength ranges to include, in each stripelike image element, corresponding color components; such filtering regions are arranged so that, considered in the direction across each stripelike image element, one of the color components is of substantially uniform intensity and other color components have different numbers of variations of intensity, whereby the image pickup tube produces a composite color video signal composed of nonfrequency modulated and different frequency modulated color video signals which can be easily frequency separated to obtain signals corresponding to color primaries.

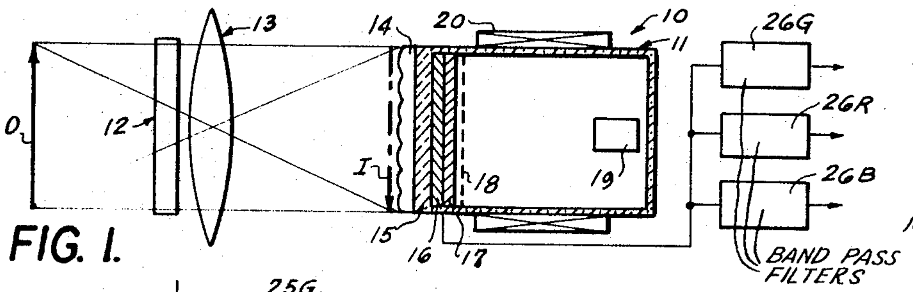
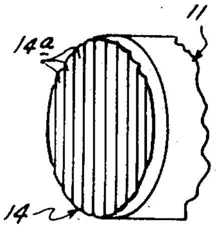
FIG. 2.
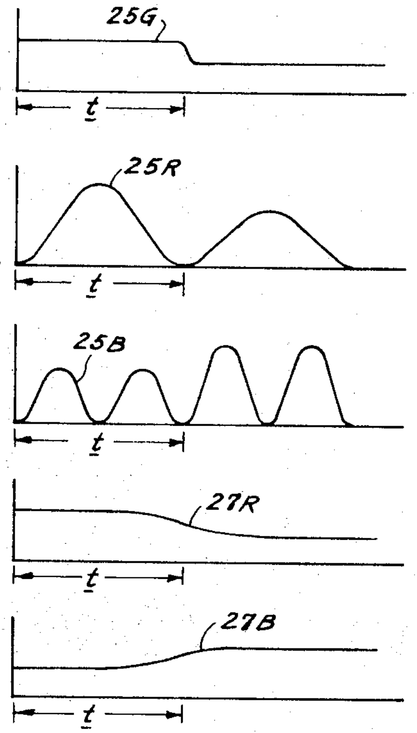
FIG. 5A. FIG. 5B. FIG. 5C. FIG. 5D. FIG. 5E.
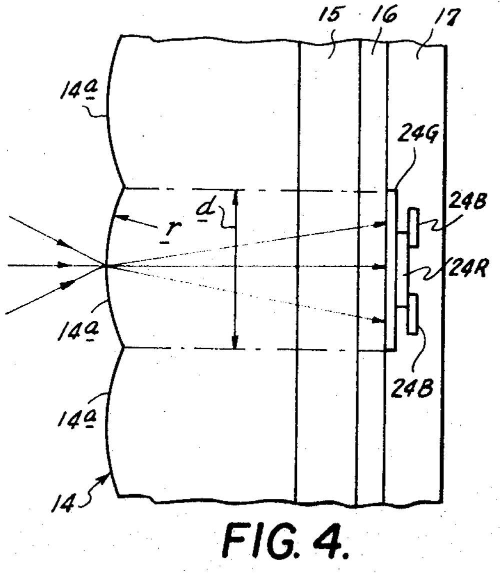
FIG. 4.
FIG. 3B.
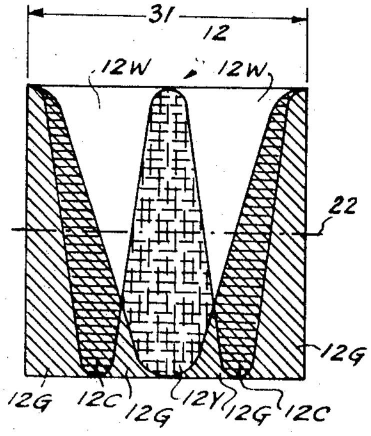
FIG. 3A.
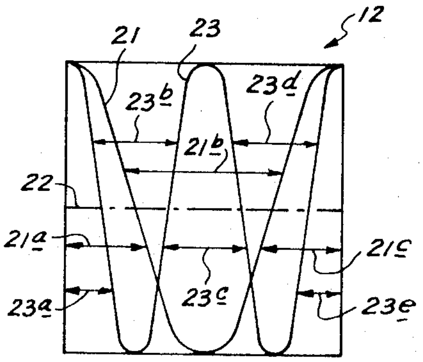
INVENTOR
TOSHIRO WATANABE
BY: Lewis H. Eslinger
ATTORNEY INVENTOR
TOSHIRO WATANABE
BY: Lewis H. Eslinger
ATTORNEY INVENTOR
TOSHIRO WATANABE
BY Lewis H. Eslinger
ATTORNEY INVENTOR
TOSHIRO WATANABE
BY Lewis H. Eslinger
ATTORNEY

COLOR SIGNAL GENERATING APPARATUS

This invention relates to a color video signal generating apparatus employing a single monochrome image pickup tube to produce color video signals corresponding to the color components of an object to be televised.

Conventional color television cameras generally employ three image pickup tubes, and the light from an object to be televised is separated, as by dichroic mirrors or other optical means, into three color primaries which are picked up by the respective pickup tubes to produce color video signals. However, these conventional color television cameras employing three image pickup tubes are inherently bulky and require complicated circuit connections in association therewith.

Color television cameras have also been proposed, for example, in U.S. Pat. No. 3,300,580, in which light from an object to be televised is separated into color components by a filter having strip filter elements and being placed in front of a single image pickup tube, and in which there is obtained from such pickup tube a composite color signal composed of a nonmodulated video signal and a video signal modulated by the strip filter elements. Such a construction permits miniaturization of the camera and simplification of its circuit connections, but fabrication of the filter presents a problem as it requires precise arrangement of, for example, 250 strips on a small glass plate, and hence color television cameras of this type are not well suited for mass production.

It has also been proposed, for example, in my copending application identified as Ser. No. 645,727, filed June 13, 1967, now U.S. Pat. No. 3,463,234, and which corresponds to Japanese Pat. application No. 38672/66, filed June 15, 1966, to provide an apparatus for generating color video signals which employs a single image pickup tube with a lens screen constituted by an assembly of parallel cylindrical lenses disposed in front of the face plate of the tube with the longitudinal axes of the lenses extending perpendicular to the scanning direction of the tube, and with a filter disposed in front of the lens screen and being constituted by a relatively simple pattern of filter elements of different wavelength band pass characteristics in the form of stripes paralleling the longitudinal axes of the cylindrical lenses, whereby light from an object to be televised is separated into color components on passage through the filter and a real image of the object is divided by the cylindrical lenses into stripelike image elements which are projected on the photoconductive layer of the tube with each such image element being composed of color images separated in the scanning direction. Thus, when the photoconductive image layer is scanned in the usual manner, a dot-sequential color video signal is obtained as the output of the single pickup tube. With the foregoing system, separation of the resulting dot-sequential color video signal into color components corresponding to the color primaries requires the provision of means by which marker signals are incorporated in the dot-sequential color video signal to identify the various color components thereof. However, the means required for incorporating marker signals in the dot-sequential color video signal so as to identify the color components thereof and the means for separating such color components may lead to undesirable complexities.

Accordingly, it is an object of the present invention to provide a color video signal generating apparatus employing a single monochrome image pickup tube to provide a composite color video signal which can be easily separated to obtain signals corresponding to the color primaries.

Another object is to provide a color video signal generating apparatus employing a single monochrome image pickup tube which produces a composite color video signal composed of nonfrequency modulated and different frequency modulated color video signals which can be easily frequency separated to obtain the signals corresponding to color primaries.

A further object is to provide a color television camera or apparatus for generating a color video signal which has the foregoing characteristics, and which is relatively easy and inexpensive to manufacture.

In accordance with an aspect of this invention, a color video signal generating apparatus employing a single monochrome image pickup tube is provided with an assembly or screen of separating lenses disposed in front of the face plate of the tube to divide a real image of an object to be televised into image elements which are projected on the photoconductive layer of the tube, and a color filter arrangement disposed in front of the screen of separating lenses and having several filtering regions respectively passing light of different wavelength ranges to include, in each image element, corresponding color components, and such filtering regions are arranged so that, considered in the scanning direction of the tube, one of the color components in each image element is of substantially uniform intensity and other color components of the image element have different numbers of variations of intensity, whereby there is obtained from the tube a composite color video signal composed of nonfrequency modulated and different frequency modulated color video signals which can be easily frequency separated to obtain signals corresponding to the color primaries.

The above, and other objects, features and advantages of the invention, will be apparent in the following detailed description of illustrative embodiments thereof which is to be read in connection with the accompanying drawings, wherein:

FIG. 1 is a schematic top plan view, partly in section, of a color video signal generating apparatus in accordance with one embodiment of this invention;

FIG. 2 is a perspective view schematically illustrating a lens screen included in the apparatus of FIG. 1;

FIG. 3A is a front elevational view schematically illustrating a color filter employed in the apparatus of FIG. 1;

FIG. 3B is a view similar to that of FIG. 3A, but showing the manner in which the various regions of the color filter are defined;

FIG. 4 is an enlarged schematic view illustrating the manner in which each element of the image projected on the photoconductive layer of the tube employed in the apparatus of FIG. 1 is composed of color components;

FIGS. 5A to 5E are diagrammatic representations of color signal wave forms obtainable with the apparatus of FIG. 1;

Figure 6:
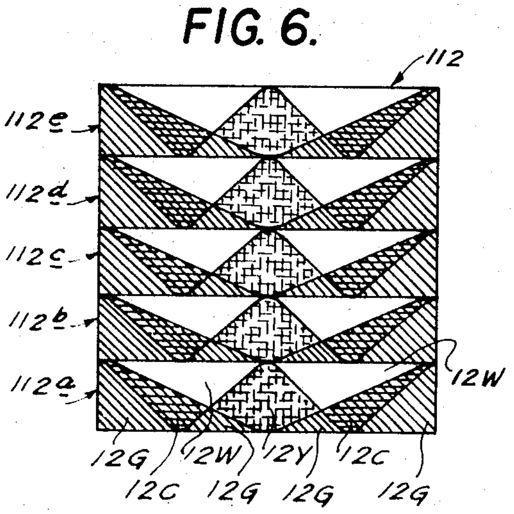
FIGS. 6 and 7 are front elevational views showing color filters in accordance with other embodiments of the invention.

Referring to the drawings in detail, and initially to FIG. 1 thereof, it will be seen that an apparatus 10 for generating color video signals in accordance with this invention generally comprises a single monochrome image pickup tube 11, for example, in the form of a vidicon tube, a color filter 12, a camera or objective lens 13 and a lens screen 14.

The tube 11 is shown to include the usual face plate 15 having a transparent electrode 16 on its inner surface which, in turn, is covered by a photoconductive layer 17, for example, formed of PbO. A mesh electrode 18 is located within the envelope of tube 11 adjacent photoconductive layer 17, and an electron gun device 19 is located adjacent the end of the envelope remote from face plate 15 to emit an electron beam which is focused on photoconductive layer 17 and made to scan the surface of the latter by means of a beam deflection arrangement indicated at 20. Conventional electronic components (not shown) which form no part of this invention are connected with tube 11 in the usual manner to effect scanning of layer 17 and to receive and utilize signals from the tube which represent the object 0 to be televised. As is usual, scanning of layer 17 may be effected by horizontally oscillating the electron beam and successively vertically displacing the beam upon each of its successive oscillations so that the entire useful area of photoconductive layer 17 is cyclically covered by a series of the horizontal oscillations.

As shown in FIG. 3A, a color filter 12 that may be employed in apparatus 10 in accordance with this invention consists of green color filter regions 12G, cyan (greenish-blue) color filter regions 12C, a yellow color filter region 12Y, and transparent or clear regions 12W. As shown in FIG. 3B, such regions of color filter 12 are defined by dividing the latter into three areas 21*a*, 21*b* and 21*c* by means of a sinusoidal curve 21 which is bisected by a reference line 22, and by further dividing the color filter into five areas 23*a*—23*e* by means of a sinusoidal curve 23 which is also bisected by reference line 22 and has a frequency twice that of the sinusoidal curve 21. The green color filter regions 12G are defined by the areas 23*a* and 23*e*, and also by the small portions of areas 21*a* and 21*c* which overlap the area 23*c*. The cyan color filter regions 12C are defined by the portions of areas 21*a* and 21*c* which respectively overlap the areas 23*b* and 23*d*. The yellow color filter region 12Y is defined by the portion of area 21*b* overlapped by area 23*c*, and the clear or transparent regions 12W are defined by the portions of area 21*b* overlapped by areas 23*b* and 23*d*.

As shown on FIG. 1, color filter 12 is disposed at a predetermined location spaced forwardly from face plate 15 and lies in a plane parallel to the latter with the reference line 22 extending horizontally, that is, in the scanning direction of tube 11.

The lens screen 14 provided in accordance with this invention may consist of an assembly of a relatively large number, for example, 150 to 200, of cylindrical lenses 14*a*, which are referred to as "lenticules" and arranged at regular intervals with their longitudinal axes extending parallel to each other, as shown on FIGS. 2 and 4. The cylindrical lenses 14*a* making up lens screen 14 may be conveniently formed integral with each other, as by suitably molding the lens screen as a unit, for example, from glass, acrylic resin or the like. The lens screen 14 thus formed is shown secured to the front surface of face plate 15, as by a suitable adhesive binder, with such lens screen being disposed so that the longitudinal axes of its cylindrical lenses 14*a* extend vertically, that is, at right angles to the scanning direction of the tube. Of course, it is possible to form the lenticules or cylindrical lenses 14*a* directly on face plate 15 of tube 11, but such arrangement is not as practical, in terms of its manufacture, as the illustrated arrangement employing a separately formed lens screen 14 secured to the face plate.

The camera or objective lens 13 may be interposed between color filter 12 and lens screen 14, as shown. Although the camera lens 13 is shown schematically as a simple, single element, in practice, it will be desirable to employ a multielement lens for achieving the desired optical performance characteristics. The camera lens 13 is provided to focus on lens screen 14 a real image I of the object O which is to be televised.

The width *d* and the curvature *r* (FIG. 4) of each cylindrical lens 14*a*, the width or dimension *w* (FIG. 3A) of color filter 12 in the direction of its reference line 22 which is at right angles to the longitudinal axes of the cylindrical lenses, and the focal length of camera lens 13 are selected so that the light from object 0 directed to each cylindrical lens 14*a* is separated into respective color components by the several color filter regions of color filter 12 and the real image I of the object is divided by the several cylindrical lenses into stripelike image elements which are projected onto corresponding portions of photoconductive layer 17. In practice, the best focus position for lens 13 may be determined by photographic tests.

With the above-described color filter 12, the green color component of the light from object 0 passes through the entire area of color filter 12, the red color component passes only through the area 21*b* which includes the yellow color filter region 12Y and the clear or transparent regions 12W, and the blue color component passes only through the areas 23*b* and 23*d* which include the cyan color filter regions 12C and the clear or transparent regions 12W. Further, the light which enters lens screen 14 is scattered on photoconductive layer 17 in the direction of the longitudinal axis of each cylindrical lens 14*a*.

When the object 0 is completely white, that is, when white light is directed at color filter 12, there are produced, at each stripelike area of photoconductive layer 17 corresponding to each cylindrical lens 14*a*, a green color component 24G which extends completely across the stripelike area and is of a substantially uniform intensity or amplitude in the direction at right angles to the longitudinal axis of the respective lens 14*a*, and red and blue color components 24R and 24B the amplitudes or intensities of which vary, in the direction at right angles to the longitudinal axis of the respective cylindrical lens, in a sinusoidal manner corresponding to the curves 21 and 23, respectively. In other words, when white light is directed into apparatus 10, the stripelike image element projected onto photoconductive layer 17 by each cylindrical lens 14*a* includes a green color component of uniform intensity in the direction across the stripelike image element, a red color component the intensity of which varies once in such direction across the stripelike image element, and a blue color component the intensity of which varies twice in the direction, across the stripelike image element. Of course, when a multicolored object is viewed by apparatus 10, the levels of the green color component 24G, the red color component 24R and the blur color component 24B of the image element corresponding to each of cylindrical lenses 14*a* will depend upon the quantities of the respective color components appearing in the light from the parts of the object 0 corresponding to the respective image element. Therefore, when photoconductive layer 17 is scanned by the electron beam in directions at right angles to the longitudinal axes of lenses 14*a*, there is obtained from the electrode 16 in each scanning period *t* corresponding to the transverse of each stripelike image element projected by a lens 14*a*, a composite output composed of a green signal 25G (FIG. 5A) which is substantially at a uniform level during any one scanning period, and red and blue signals 25R and 25B (FIGS. 5B and 5C) which are modulated at different frequencies and which reach maximum levels during each scanning period corresponding to the quantities of the respective color components in the related areas of the object.

The green color signal 25G, red color signal 25R and blue color signal 25B are easily separated from the composite signal emanating from electrode 16 by the use of band-pass filters 26G, 26R and 26B, as indicated on FIG. 1, and the red and blue color signals 25R and 25B, which are thus frequency separated from the green color signal 25G and from each other, are then amplitude detected in a conventional manner to obtain red and blue color video signals 27R and 27B, as depicted on FIGS. 5D and 5E, whereas the separated green color signal 25G can be used as such as a green video color signal.

If, for example, the lens screen 14 is composed of 150 cylindrical lenses 14*a* and the line scanning frequency is 15 kc; then the center frequencies of the red and blue color video signals 25R and 25B are the respective products of the number of lenses, the line scanning frequency and the number of variations in intensity per scanning period, which are 2.25 mc. and 4.5 mc., respectively, and it is possible to select the green, red and blue color video signal to be in bands ranging from zero to 1.175 mc., 1.175 to 3.425 mc. and 3.425 to 5.675 mc., respectively. Hence the several video signals do not have particularly high frequencies and can be handled with ease.

Since a single color filter 12 is employed in connection with a single image pickup tube 11, and since the various color filter regions or filter 12 need only be arranged to provide one color signal which is nonfrequency modulated and two other color signals which are modulated at different frequencies, the color filter regions of filter 12 need not be large in number nor excessively small and thus can be readily produced.

In order to enhance the uniformity of color distribution in the lengthwise direction of each cylindrical lens 14*a* of lens screen 14, it is preferred to employ in apparatus 10 a color filter 112 (FIG. 6) which consists of a plurality of filter elements 112*a*–112*e* arranged sequentially in parallel with each other, and each having green, cyan, yellow and clear filter regions 12G, 12C, 12Y and 12W, respectively, similar to the correspondingly numbered regions on previously described filter 12.

Figure 7:
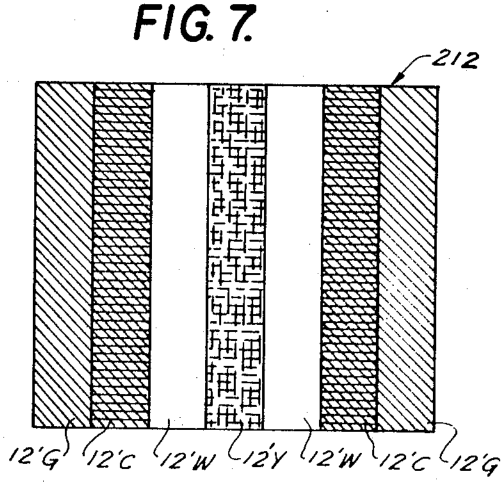

Although the color filter regions of color filter 12 and of each of the elements of color filter 112 are defined by sinusoidal curves, as at 21 and 23 on FIG. 3B, such division of the areas of the color filter is not always required. Thus, for example, as shown on FIG. 7, a color filter 212 for use in the apparatus 10 in accordance with this invention, may consist of stripelike rectangular green color, cyan color, yellow color and transparent or clear filter regions 12′G, 12′C, 12′Y and 12′W arranged sequentially in the order 12′G, 12′C, 12′W, 12′Y, 12′W, 12′C and 12′G, as shown. However, the use of color filter 212 permits a considerable amount of harmonic components to be included in the red and blue color signals obtained from electrode 16 so that separation of the color signals is likely to be more difficult than when color filters 12 and 112 are employed.

Although the previously described color filters have their color filter regions arranged to provide a single variation of the red color signal during each scanning period, it is apparent that the shape and numbers of the color filter regions may be varied to provide other numbers of variations of the respective color signals during each scanning period. It is also apparent that the colors selected for the several color filter regions of the described filters may be varied from those indicated above.

Figure 8A:
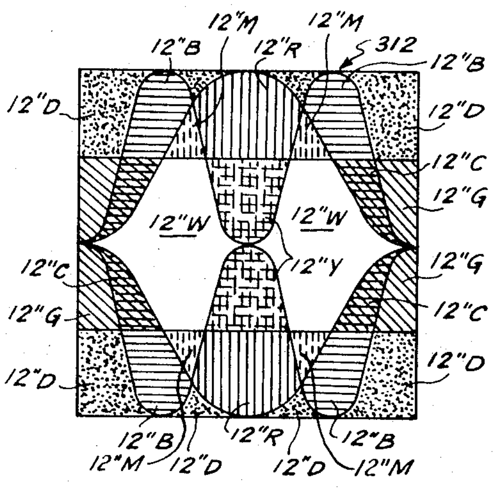
FIGS. 8A and 8B are views similar to FIGS. 3A and 3B, but showing still another modification of the color filter.
Figure 8B:
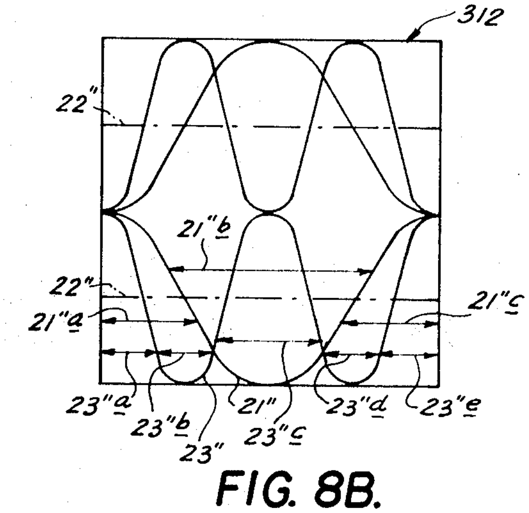

Referring now to FIGS. 8A and 8B, it will be seen that another form of color filter 312 for use in apparatus in accordance with this invention consists of two similar half portions, each of which is, in turn, divided in half by the reference line 22″. Further, each half portion of filter 312 is divided by a sinusoidal curve 21″ into three areas 21″*a*, 21″*b* and 21″*c*, and further divided by a sinusoidal curve 23″ into five areas 23″*a*–″*e* (FIG. 8B). In each half portion of color filter 312, the portions of areas 23″*a* at the inner side of reference line 22″ are provided as green color filter regions 12″G; the portions of 23″*b* and 23″*d* at the inner side of reference line 22″ which are overlapped by areas 21″*a* and 21″*c* are provided as cyan color filter regions 12″C; the portion of areas 23″*c* at the inner side of reference line 22″ is provided as a yellow color filter region 12″Y; the portion of area 21″*b* at the inner side of reference line 22″ which is not overlapped by area 23″*c* is provided as transparent or clear regions 12″W; the portions of areas 21′*a* and 21″*c* at the outer side of reference line 22″ which are overlapped by areas 23″*b* and 23″*d* are provided as blue color filter regions 12″B; the portion of area 21″*b* at the outer side of reference line 22″ which is overlapped by area 23″*c* is provided as a red color filter region 12″R; the portions of area 21″*b* at the outer side of reference line 22″ which are overlapped by areas 23″*b* and 23″*d* are provided as magenta color filter regions 12″M; and the remaining areas of the filter are rendered opaque, as at 12″D.

When the above-described color filter 312 is employed in apparatus 10, there is obtained from electrode 16 a composite signal composed of a green color component signal $\frac{G}{2}$, a red color component signal $\frac{R}{2}+\frac{R}{2}\sin\omega t$ and a blue color component signal $\frac{B}{2}+\frac{B}{2}\sin 2\omega t$, that is, a composite signal $Y=\left(\frac{G}{2}+\frac{R}{2}+\frac{B}{2}\right)+\frac{R}{2}\sin\omega t+\frac{B}{2}\sin 2\omega t$ which is composed of a luminance signal and a chrominance signal.

Although the above-described embodiments of the invention each employ a single color filter 12, 112, 212 or 312 each having various regions to transmit light of different wavelength ranges corresponding to the several color components, it is also possible to employ a plurality of separate color filters corresponding to the respective color components. Thus, as shown on FIG. 9, in an apparatus according to the invention, dichroic mirrors 28 and 29 and a reflector 30 are interposed in an optical path between the object O and lens screen 14 so as to divide a portion of such path into three parallel branches PR, PG and PB in which red, green and blue color filters 412R, 412G and 412B are respectively interposed. The green color filter 412G is provided with a uniform filtering characteristic over its entire area. However, the red color filter 412R is provided with a varying degree of transparency which gradually increases and then decreases in the direction across the filter, and the blue color filter 412B is provided with a varying degree of transparency which gradually increases and then decreases twice in the direction across such filter. The light passing through filters 412R, 412G and 412B in branches PR, PG and PB is composed by a reflector 31 and dichroic mirrors 32 and 33 and is then projected to lens screen 14.

In the foregoing arrangement, the red and blue color filters 412R and 412B are disposed so that the directions of the variations of the degrees of transparency therein will be at right angles to the longitudinal axes of the cylindrical lenses of lens screen 14, that is, in the scanning direction of tube 11.

Figure 9:
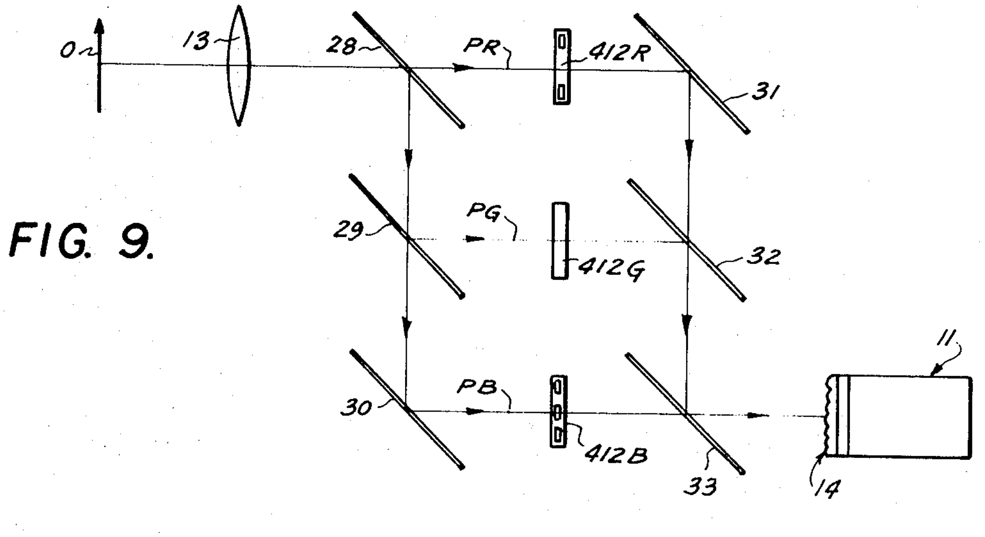
FIGS. 9 and 10 are views similar to FIG. 1, but showing color video signal generating apparatus in accordance with other embodiments of this invention.
Figure 10:
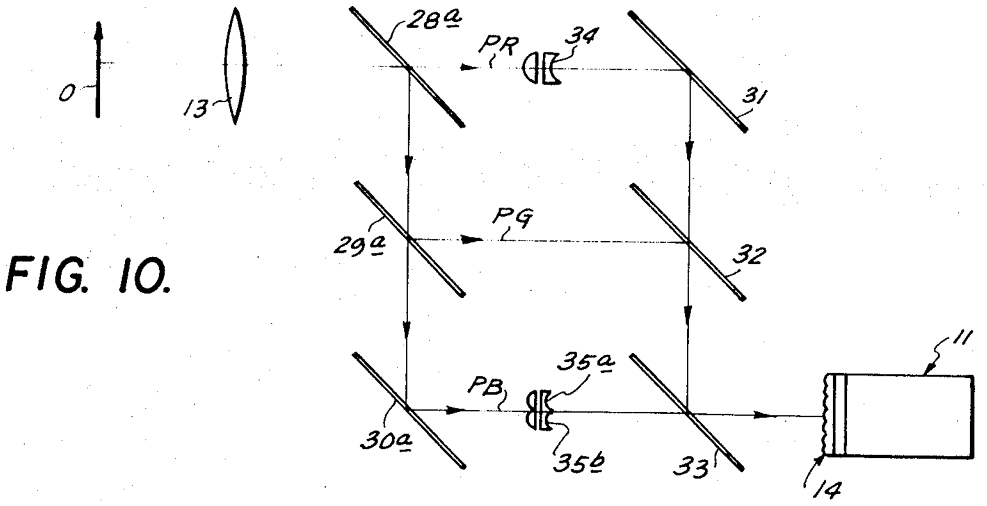

Referring now to FIG. 10, it will be seen that in another embodiment of this invention which is similar to that shown on FIG. 9, the color filters 412R, 412G and 412B of the latter are eliminated and red, green and blue light is made to pass in the path branches PR, PG and PB, respectively, by incorporating suitable color filters in dichroic mirrors 28*a* and 29*a* and by employing reflector 30*a* having optical characteristics. Further, in the apparatus of FIG. 10, a lens 34 is interposed in the path branch PR to condense the red light in such path branch into a single thin and flat light beam, and two lenses 35*a* and 35*b* are interposed, side by side, in the path branch PB to separate the blue light in such path branch into two thin and flat light beams. The lenses 34, 35*a* and 35*b* are arranged so that the long dimensions of the cross sections of the resulting thin and flat beams are parallel to the longitudinal axes of the cylindrical lenses of lens screen 14. Once again, the light in the path branches PR, PG and PB is composed by a reflector 31 and dichroic mirrors 32 and 33 so as to be projected to the lens screen 14.

Figure 11:
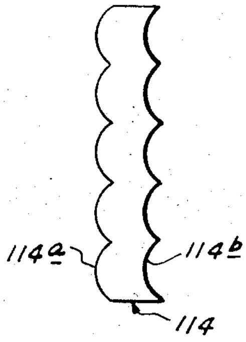
FIGS. 11, 12 and 13 are schematic end elevational views of modified forms of lens screens as viewed from the top, and which are adapted for use in apparatus according to this invention in place of the lens screen of FIG. 2.
Figure 12:
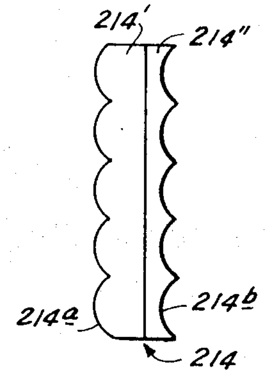
Figure 13:
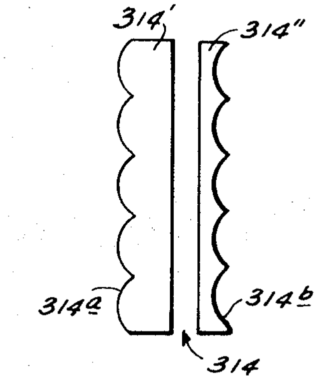

In the illustrations of the above-described embodiments of the invention, the lens screen 14 has been shown as constituted by an assembly of cylindrical lenses 14*a* formed on only one face thereof. However, as shown on FIG. 11, a lens screen 114 for use in apparatus in accordance with this invention may have cylindrical lenses 114*a* and 114*b* of approximately equal curvature formed on the opposite faces thereof. As shown on FIG. 12, a lens screen 214 in accordance with this invention having cylindrical lenses 214*a* and 214*b* formed on its opposite faces may be constituted of two portions 214′ and 214″ of materials having different indices so as to compensate for color aberration. Such portions 214′ and 214″ of materials having different indices may be in contact with each other or cemented, as in FIG. 12, or, as in the case of the lens screen 314 of FIG. 13, the two portions 314′ and 314″ of the lens screen formed with cylindrical lenses 314*a* and 314*b*, respectively, may be interposed in the optical path in spaced relation to each other.

Figure 14:
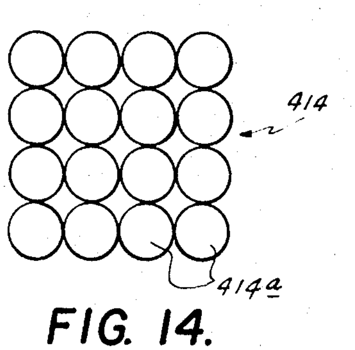
FIG. 14 is a front elevational view of still another modification of the lens screen in accordance with this invention.

Although the previously described lens screens consisted of assemblies of cylindrical lenses having their longitudinal axes extending parallel to each other, a lens screen 414 (FIG. 14) for use in apparatus according to this invention may be made up of an assembly of small spherical lenses 414*a* arranged in parallel rows and, in that case, the images resolved by the spherical lenses 414*a* can be partly overlapped.

Figures 15, 16:
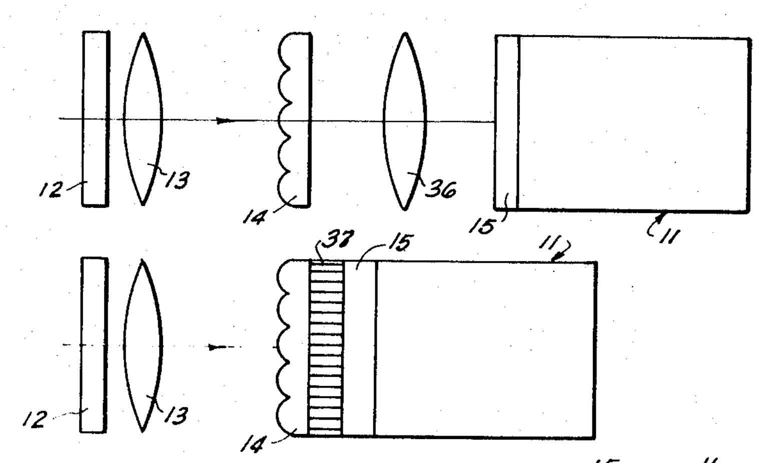
FIGS. 15, 16 and 17 are views similar to that of FIG. 1, but showing still further modifications of the apparatus according to this invention.
Figure 17:
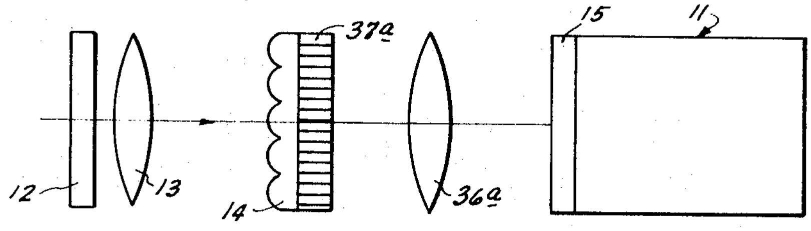

In the foregoing description, the lens screen has been referred to as being a part of, or attached directly to face plate 15 of the image pickup tube 11. However, as shown in FIG. 15, the lens screen 14 may be spaced forwardly from face plate 15 with a relay lens 36 being interposed therebetween, or, as shown on FIG. 16, the image elements divided by lens screen 14, and each consisting of several color components, may be transmitted to the photoconductive layer of tube 11 by means of an optical fiber assembly 37 interposed between lens screen 14 and face plate 15. The opposite ends of the optical fibers making up assembly 37 may be in direct contact with lens screen 14 and face plate 15, as on FIG. 16, or, as shown on FIG. 17, the optical fiber assembly 37*a* may contact only the back surface of lens screen 14 and be spaced from face plate 15 with a relay lens 36*a* interposed therebetween to project the divided image elements made up of color components onto the photoconductive layer of tube 11.

If desired, a magnifying lens (not shown) may be interposed in the optical path between the object to be televised and the lens screen 14 so as to magnify the image of such object in a direction at right angles to the longitudinal axes of the cylindrical lenses, that is, in the scanning direction of the tube, thereby to enhance resolution in the line scanning direction.

Further, in those cases where the color filter has a number of color filter regions through which light of different wavelength ranges may be transmitted, for example, as in the color filters 12, 112, 212, and 312, such color filters may be replaced by reflectors having similarly shaped regions of different color selecting characteristics.

In the above description of embodiments of this invention, the possibility of obtaining color video signals with a single image pickup tube has been emphasized, but it should be understood that color video signals of enhanced resolution can be produced by the employment of the apparatus described herein in combination with an additional pickup tube for generating luminance signals.

Although specific embodiments of the invention have been described in detail herein, it will be understood that the invention is not limited to those precise embodiments, and that various changes and modifications may be effected therein by one skilled in the art without departing from the scope or spirit of the invention, as defined in the appended claims.

I claim:

1. A color video signal generating apparatus comprising image pickup means having scanning means and being operative to photoelectrically convert light projected onto said image pickup means into an electrical output composed of successive signals corresponding to the intensities of light successively encountered by said scanning means in a line scanning direction, a screen of separating lenses to divide an image of an object to be televised into image elements projected onto corresponding areas of said image pickup means, and filter means interposed optically between the object to be televised and said screen, said filter means having several regions respectively selecting light of different wavelength ranges so that each of said image elements is composed of corresponding color components, said regions providing different numbers of variations of intensity of two of said color components of each image element considered in said line scanning direction, said filter means providing a substantially uniform intensity, considered in said line scanning direction, of one of said color components in each image element, whereby the signals corresponding to the respective color components can be easily separated out of said electrical output on the basis of their respective numbers of variations of amplitude and said separated one color component can be used directly as a color component video signal.

2. A color video signal generating apparatus according to claim 1; in which said image pickup means in an image pickup tube.

3. A color video signal generating apparatus according to claim 1; in which a particular number of variations corresponds to a particular center frequency, and said electrical output is a composite of nonfrequency modulated signals corresponding to said one color component and of frequency-modulated signals corresponding to said two color components.

4. A color video signal generating apparatus according to claim 3; further comprising electrical band-pass filters receiving said electrical output and separating said nonmodulated and modulated signals.

5. A color video signal generating apparatus according to claim 1; in which said regions of the filter means are transparent and operative to respectively transmit light of said different wavelength ranges.

6. A color video signal generating apparatus according to claim 5; in which said regions are portions of a single transparent plate.

7. A color video signal generating apparatus according to claim 5; in which said filter means includes a plurality of filters each constituting a respective one of said regions.

8. A color video signal generating apparatus according to claim 1; in which said regions of the filter means are selectively reflective with respect to light of said different wavelength ranges.

9. A color video signal generating apparatus according to claim 8; in which said filter means includes a plurality of mirrors each constituting a respective one of said regions.

10. A color video signal generating apparatus according to claim 1; in which said separating lenses are cylindrical lenses having their longitudinal axes parallel to each other and arranged at right angles to said line scanning direction.

11. A color video signal generating apparatus according to claim 1; in which said separating lenses are spherical and arranged in parallel rows directed at right angles to said line scanning direction.

12. A color video signal generating apparatus according to claim 1; in which said filter means, considered in said line scanning direction, is approximately uniformly transmissive with regard to green color light, has a varying transmissiveness with respect to red color light which increases and then decreases once in said line scanning direction, and has a varying transmissiveness with respect to blue color light which increases and decreases twice in said line scanning direction.

13. A color video signal generating apparatus according to claim 1; in which said filter means includes a transparent plate having at least one filter element thereon consisting of said regions at least some of which are respectively green, cyan, yellow and clear and arranged to transmit green color light through said plate over the entire area of said filter element, said clear and yellow regions transmitting red color light and being enclosed by a sinusoidal perimeter having a bisector parallel to said line scanning direction, and said cyan and clear regions transmitting blue color light being enclosed by a sinusoidal perimeter having a frequency different from that of the first-mentioned sinusoidal perimeter and the same bisector as the latter.

14. A color video signal generating apparatus according to claim 1; further comprising optical means to divide light from the object into three paths and then to compose the light in said three paths for projection onto said lens screen, and in which said filter means includes green, red and blue color filters interposed respectively in said three paths, one of said color filters being uniformly transmissive with respect to light of the respective color, and the other two of said color filters having different numbers of variations of transmissiveness of the respective colors considered in the direction thereacross which is parallel to said line scanning direction.

15. A color video signal generating apparatus according to claim 1; further comprising optical means to divide light from the object into three paths and then to compose the light in said three paths for projection onto said lens screen, said filter means being included in said optical means so that only red, green and blue color lights are respectively in said three paths, and first and second lens means being interposed in two of said paths, said first lens means condensing the respectively colored light into one thin and flat beam and said second lens means condensing the respectively colored light into two spaced, parallel, thin and flat beams, the largest cross-sectional dimensions of said thin and flat beams extending at right angles to said line scanning direction.